United States Patent
Yamamoto (10) Patent No.: US 9,716,821 B2
(45) Date of Patent: Jul. 25, 2017

(54) IMAGE PICKUP APPARATUS, IMAGE PICKUP SYSTEM, METHOD OF CONTROLLING IMAGE PICKUP APPARATUS, AND STORAGE MEDIUM

(71) Applicant: CANON KABUSHIKI KAISHA, Tokyo (JP)

(72) Inventor: Hideaki Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 14/608,949

(22) Filed: Jan. 29, 2015

(65) Prior Publication Data
US 2015/0222807 A1    Aug. 6, 2015

(30) Foreign Application Priority Data
Jan. 31, 2014  (JP) .................................. 2014-016308

(51) Int. Cl.
*H04N 5/232*    (2006.01)
*G02B 7/34*    (2006.01)

(52) U.S. Cl.
CPC ........... *H04N 5/23212* (2013.01); *G02B 7/34* (2013.01)

(58) Field of Classification Search
CPC .............................. H04N 5/23212; G02B 7/34
USPC .............. 348/349, 345, 348, 350; 250/201.2
See application file for complete search history.

(56) References Cited

U.S. PATENT DOCUMENTS

| 5,461,439 | A | * | 10/1995 | Minakuti | G03B 17/24 396/213 |
| 5,528,330 | A | * | 6/1996 | Utagawa | G02B 7/346 250/201.2 |
| 2011/0135292 | A1 | * | 6/2011 | Iwane | H04N 5/3696 396/113 |
| 2012/0050604 | A1 | * | 3/2012 | Hamada | G02B 7/36 348/349 |
| 2012/0224096 | A1 | * | 9/2012 | Shimoda | G02B 7/36 348/349 |
| 2013/0250164 | A1 | * | 9/2013 | Aoki | G02B 7/34 348/348 |
| 2013/0329095 | A1 | * | 12/2013 | Aoki | G02B 7/34 348/241 |
| 2014/0211075 | A1 | * | 7/2014 | Inoue | G02B 7/28 348/349 |

FOREIGN PATENT DOCUMENTS

| JP | 2002-162252 A | 6/2002 |
| JP | 2006-220684 A | 8/2006 |

* cited by examiner

*Primary Examiner* — Sinh Tran
*Assistant Examiner* — Zhenzhen Wu
(74) *Attorney, Agent, or Firm* — Cowan, Liebowitz & Latman, P.C.

(57) ABSTRACT

An image pickup apparatus includes a light receiving element configured to photoelectrically convert an optical image to output a pair of image signals, a selection unit configured to select a focus detection region from among a plurality of focus detection regions, and a calculation unit configured to calculate a defocus amount based on the image signals from the selected focus detection region and a correction value for the selected focus detection region, and the correction value varies depending on the plurality of focus detection regions.

13 Claims, 4 Drawing Sheets

| | | FOCUS DETECTION REGION | |
|---|---|---|---|
| | | N1 | N2 |
| CORRECTION VALUE | δ1 | δ1_N1 | δ1_N2 |
| | δ2 | δ2_N1 | δ2_N2 |
| | θ | θ_N1 | θ_N2 |

FIG. 5

IMAGE PICKUP APPARATUS, IMAGE PICKUP SYSTEM, METHOD OF CONTROLLING IMAGE PICKUP APPARATUS, AND STORAGE MEDIUM

BACKGROUND OF THE INVENTION

Field of the Invention

The present invention relates to an image pickup apparatus that performs focus detection.

Description of the Related Art

Conventionally, an image pickup apparatus has been known that covers a pair of object images (optical images) into electric signals (image signals) by using an AF sensor to detect a focus state of an image pickup optical system based on a phase difference of a pair of image signals. The focus state of the image pickup optical system is detected while a focus detection region is changed depending on an object, an imaging lens, or setting of a camera.

Japanese Patent Laid-open No. 2006-220684 discloses a configuration in which a focus detection region (signal accumulation region) is changed to increase the number of the focus detection regions such that a focus detection time can be reduced even when a defocus amount is large. Japanese Patent Laid-open No. 2002-162252 discloses a configuration in which an optimum focus detection region (signal accumulation region) is determined in accordance with setting of a range of driving a distance ring of an imaging lens so as to achieve high-speed processing and prevent erroneous focus detection without unnecessary calculation processing.

However, when the accumulation region (focus detection region) of the AF sensor is changed as disclosed in Japanese Patent Laid-open Nos. 2006-220684 and 2002-162252, a center position of the focus detection region may be changed. A typical image pickup apparatus calculates a defocus amount by using a correction value depending on each AF frame (focus detection point) for an image shift amount obtained by a correlation calculation in the focus detection. In this case, if the center position of the focus detection region is changed, a precise correction cannot be performed and it is difficult to calculate a highly-accurate defocus amount. Recently, an image pickup apparatus in which highly-dense AF frames over 40 points are settable has been proposed, and there is a remarkable tendency to change the center position of the focus detection region and accordingly to reduce the focus detection accuracy (calculation accuracy of the defocus amount).

SUMMARY OF THE INVENTION

The present invention provides an image pickup apparatus, an image pickup system, a method of controlling the image pickup apparatus, and a non-transitory computer-readable storage medium that are capable of calculating a defocus amount with high accuracy.

An image pickup apparatus as one aspect of the present invention includes a light receiving element configured to photoelectrically convert an optical image to output a pair of image signals, a selection unit configured to select a focus detection region from among a plurality of focus detection regions, and a calculation unit configured to calculate a defocus amount based on the image signals from the selected focus detection region and a correction value for the selected focus detection region, and the correction value varies depending on the plurality of focus detection regions.

An image pickup system as another aspect of the present invention includes the image pickup apparatus and an interchangeable lens removably attachable to the image pickup apparatus.

A method of controlling the image pickup apparatus as another aspect of the present invention includes the steps of converting photoelectrically an optical image to output a pair of image signals, selecting a focus detection region from among a plurality of focus detection regions, and calculating a defocus amount based on the image signals from the selected focus detection region and a correction value for the selected focus detection region, and the correction value varies depending on the plurality of focus detection regions.

A non-transitory computer-readable storage medium as another aspect of the present invention stores a program to cause a computer to execute a process including the steps of selecting a focus detection region from among a plurality of focus detection regions, and calculating a defocus amount based on the image signals from the selected focus detection region and a correction value for the selected focus detection region, and the correction value varies depending on the plurality of focus detection regions.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Figure 1:
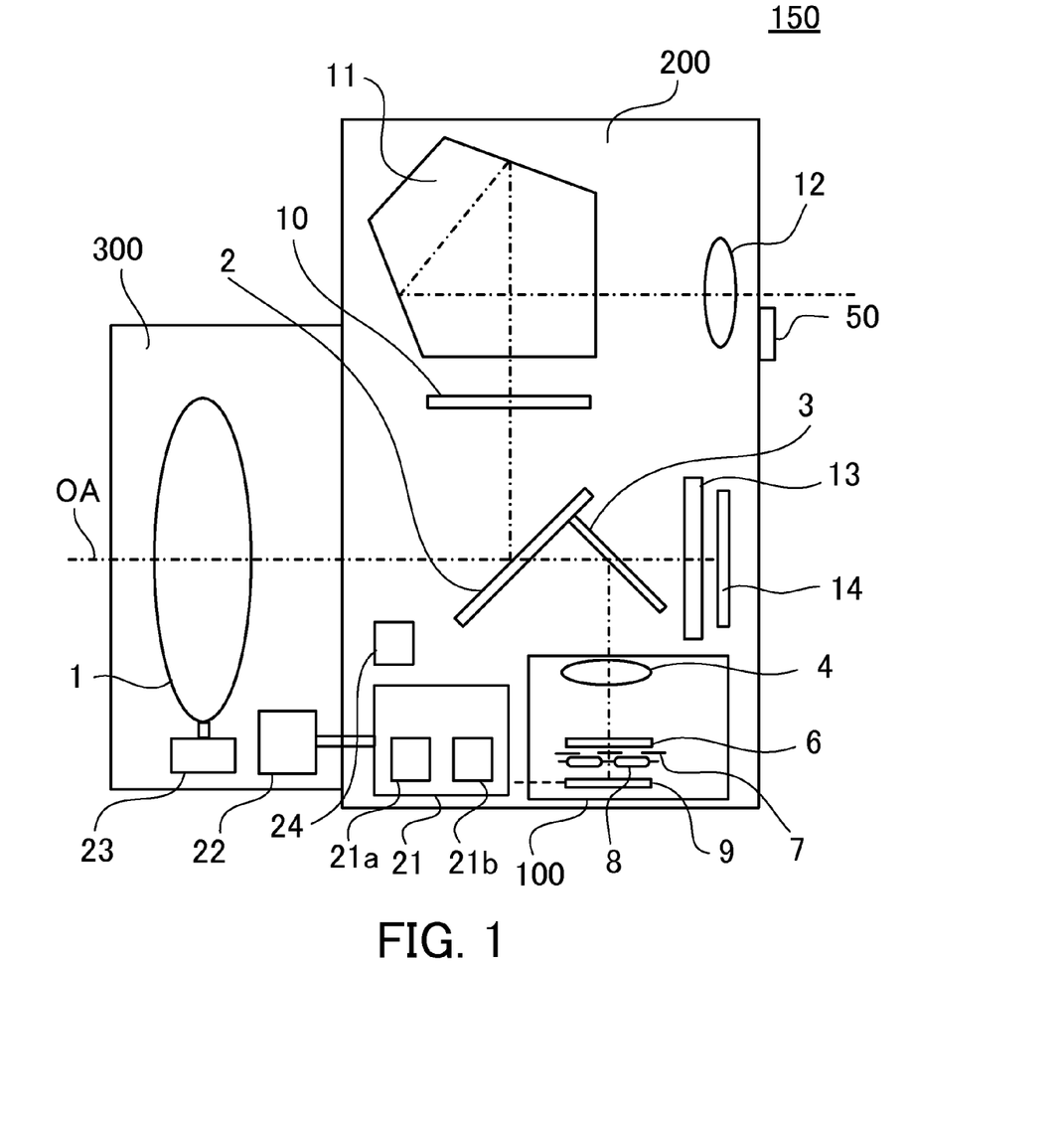
FIG. 1 is a configuration diagram of an image pickup apparatus in this embodiment.

First of all, referring to FIG. 1, an image pickup apparatus in this embodiment will be described. FIG. 1 is a configuration diagram of an image pickup apparatus 150 (single-lens reflex camera) in this embodiment. In FIG. 1, reference numeral 200 denotes a camera body (image pickup apparatus body) that constitutes a mirror box. Reference numeral 300 denotes an interchangeable lens (lens apparatus) that is removably attachable to a mount (not illustrated) of the camera body 200. The interchangeable lens 300 includes an imaging lens 1 (image pickup optical system). In FIG. 1, the imaging lens 1 is depicted as one lens, but actually it is a lens unit that includes a plurality of lenses. The image pickup apparatus 150 of this embodiment is not limited to the configuration in which the lens apparatus (interchangeable lens 300) is removably attachable to the camera body 200, and the lens apparatus may also be integrated with the camera body 200.

In the camera body 200, reference numeral 2 denotes a quick return mirror, and reference numeral 3 denotes a sub mirror. Reference numeral 100 denotes a focus detection unit. Reference numeral 10 denotes a focusing plate, and reference numeral 11 denotes a penta dach prism that is used to form an erected image. Reference numeral 12 denotes an eyepiece. The focusing plate 10, the penta dach prism 11, and the eyepiece 12 constitute a finder optical system.

Reference numeral 13 denotes an optical filter that includes an infrared cut filter. Reference numeral 14 denotes an image pickup element that photoelectrically converts an object image (optical image) formed by the imaging lens 1 to output an image signal (electric signal) and that includes a photoelectric conversion element such as a CCD sensor or a CMOS sensor. Reference numeral 21 denotes a camera CPU (controller) that performs various calculations or operations in the camera body 200. The camera CPU 21 includes a selection unit 21a that selects one focus detection region from among a plurality of focus detection regions. The camera CPU 21 further includes a calculation unit 21b that calculates a defocus amount based on an image signal obtained from the focus detection region and a correction value (correction information) for the focus detection region.

In the interchangeable lens 300, reference numeral 22 denotes a memory (storage unit). The memory 22 stores various information on the interchangeable lens 300. Reference numeral 23 denotes a focus motor (drive unit). The focus motor 23 moves a focus lens (not illustrated) included in the imaging lens 1 to a direction of an optical axis OA (optical axis direction) to perform focusing of the imaging lens 1. The operation of the focus motor 23 (i.e. focusing) is controlled based on an instruction from the camera CPU 21.

Reference numeral 50 denotes a camera operation member (operation unit) that is provided on the camera body 200. One camera operation member 50 is depicted in FIG. 1, but actually the camera operation member 50 includes a plurality of operation members. A user uses the camera operation member 50 to perform various settings related to a shooting condition of the image pickup apparatus 150 such as selecting an AF frame (position to set the focus detection region, or a focus detection point) and inputting the focus detection region. For example, in this embodiment, the focus detection region may be input by the camera operation member 50 (input unit). The camera body 200 is provided with various elements such as the focus detection unit 100, the finder optical system, and an image pickup element unit including the image pickup element 14.

Next, detection (focus detection) of a focus state of the imaging lens 1 by using the focus detection unit 100 will be described. Light from an object passes through the imaging lens 1 and then enters the quick return mirror 2 that is constituted by a half mirror. Part of the light entering the quick return mirror 2 transmits through the quick return mirror 2. Then, the light is reflected by the sub mirror 3 and enters a field lens 4 of the focus detection unit 100.

The field lens 4 is disposed at a primary imaging region (i.e. primary (planned) imaging plane or its adjacent region) of the imaging lens 1. Therefore, the object image is formed on the field lens 4 or its vicinity. The field lens 4 collects the incident light (light beam). The light beam that has transmitted through the field lens 4 passes through an optical filter 6 such as an infrared cut filter and its passing range is limited by an aperture stop 7, and then the light beam enters a secondary imaging lens 8. According to functions of dividing and limiting the passing range of the light beam by the aperture stop 7, the light beam that has passed through two regions (pupil-divided regions) in an exit pupil of the imaging lens 1 enters the secondary imaging lens 8. The field lens 4 and the secondary imaging lens 8 constitute a focus detection optical system.

The secondary imaging lens 8 reimages two incident light beams on a light receiving element 9 that is used to perform focus detection. As a result, a pair of optical images (object images) is formed on the light receiving element 9 by the light beams from the two pupil-divided regions. The light receiving element 9 photoelectrically converts the pair of optical images to output a pair of image signals (electric signals).

The camera CPU 21 (focus detection unit) performs correlation calculation for the pair of image signals. Furthermore, the camera CPU 21 calculates a phase difference that indicates a relative position shift of the pair of image signals and calculates (detects) a focus state (defocus amount) of the imaging lens 1 based on this phase difference. Then, the camera CPU 21 calculates an amount of moving the focus lens (i.e. drive amount by the focus motor 23) to obtain an in-focus state based on the calculated defocus amount. In addition, the camera CPU 21 performs focusing by driving the focus motor 23 to move the focus lens in accordance with the calculation result to obtain the in-focus state. The details of focus detection processing by the camera CPU 21 will be described below.

On the other hand, the light reflected by the quick return mirror 2 is imaged on the focusing plate 10 disposed at a position that is optically conjugate to the image pickup element 14. The transmitted light (object image) that has been diffused by the focusing plate 10 is converted into an erected image by the penta dach prism 11. The erected image is enlarged by the eyepiece 12 to be observed by a user.

Figure 2:
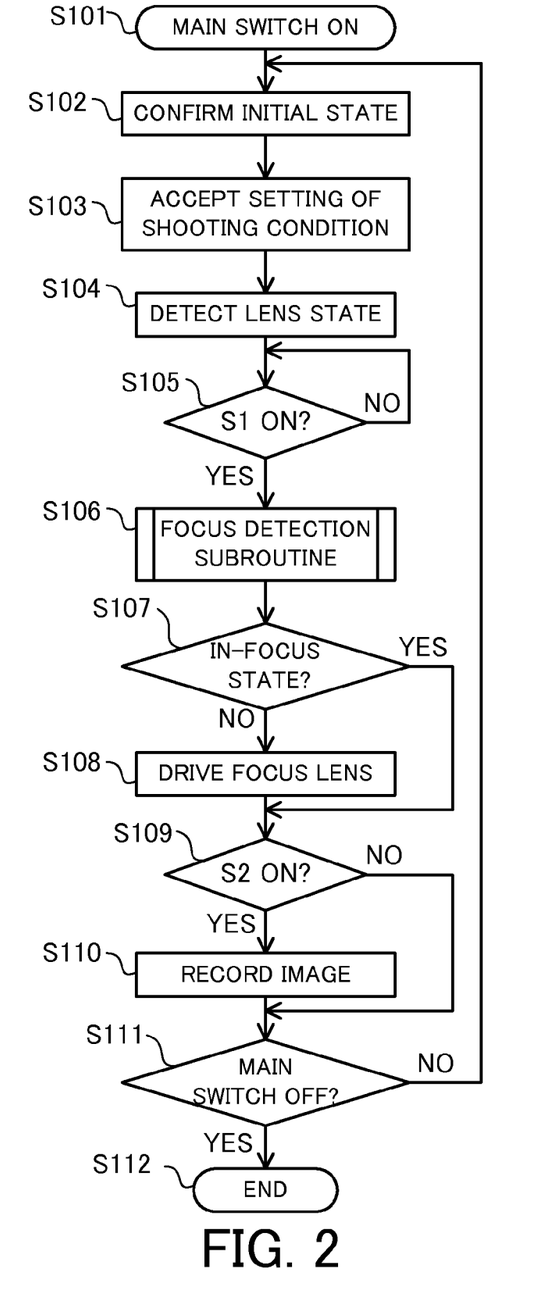
FIG. 2 is a flowchart (main flow) of an imaging operation in this embodiment.

Next, referring to FIG. 2, the imaging operation by the image pickup apparatus 150 of this embodiment will be described. FIG. 2 is a flowchart (main flow) of the imaging operation in this embodiment. Each step of FIG. 2 is performed based on mainly an instruction of the camera CPU 21.

First of all, when a user turns on a power switch (main switch) of the camera body 200 at step S101, the flow proceeds to step S102. At step S102, the camera CPU 21 initializes contents in a memory and an execution program and performs image pickup preparing operation (confirmation of an initial state). Subsequently, at step S103, the camera CPU 21 accepts setting of a shooting condition. The shooting condition is, for example an AF frame, an exposure adjusting mode, a focusing mode, an image quality (number of pixels for recording or compression rate), and the like. At step S103, the camera CPU 21 accepts the setting of the shooting condition via the camera operation member 50 by the user.

Subsequently, at step S104, the camera CPU 21 detects a state of a zoom lens (zoom state), a state of a focus lens (focus state), and a state of an aperture stop in the imaging lens 1 (image pickup optical system) (lens state detection). At this time, the camera CPU 21 reads information such as a size of an exit pupil, an exit pupil distance, and a correction value for the focusing from a ROM (storage unit) such as a memory 22.

Subsequently, at step S105, the camera CPU 21 determines whether an input (instruction) to start the focusing (focus detection) is performed by the user. This input (instruction) is performed by a half-depression state (S1 ON) of a release button of the camera operation member 50. Until this input is performed, step S105 is repeated. On the other hand, when the input to start the focusing (start the focus detection) is performed, the flow proceeds to step S106.

At step S106, the camera CPU 21 performs the focus detection described below. Subsequently, at step S107, the camera CPU 21 determines whether a lens drive amount (drive amount of the focus lens) calculated in step S106 is less than or equal to a predetermined value. When the lens drive amount is less than or equal to the predetermined value, the camera CPU 21 determines that the image pickup apparatus 150 is in an in-focus state and the flow proceeds to step S109. On the other hand, when the lens drive amount is greater than the predetermined value, the flow proceeds to step S108 and the camera CPU 21 drives the focus lens.

Subsequently, at step S109, the camera CPU 21 determines whether a shooting switch of the camera operation member 50 is operated to be turned on (whether the release button is in a full-depression state). When the shooting switch is not turned on, the flow proceeds to step S111. On the other hand, when the shooting switch is turned on (S2 ON), the flow proceeds to step S110.

Subsequently, at step S110, the camera CPU 21 evacuates the quick return mirror 2 and the sub mirror 3 to the outside of an optical path from the imaging lens 1. As a result, the light from the imaging lens 1 reaches the image pickup element 14 via the optical filter 13 to form an object image on the image pickup element 14. The image pickup element 14 photoelectrically converts the object image to output an image signal (electric signal). The camera CPU 21 generates an image based on the electric signal output from the image pickup element 14 and records the image (shot image) in a recording medium.

Then, at step S111, the camera CPU 21 determines the state of the main switch. When the ON state of the main switch is maintained, the flow returns to step S102 and steps S102 to S110 are repeatedly performed. On the other hand, when the main switch is turned off at step S111, the flow proceeds to step S112 and the imaging operation is finished.

Figure 3:
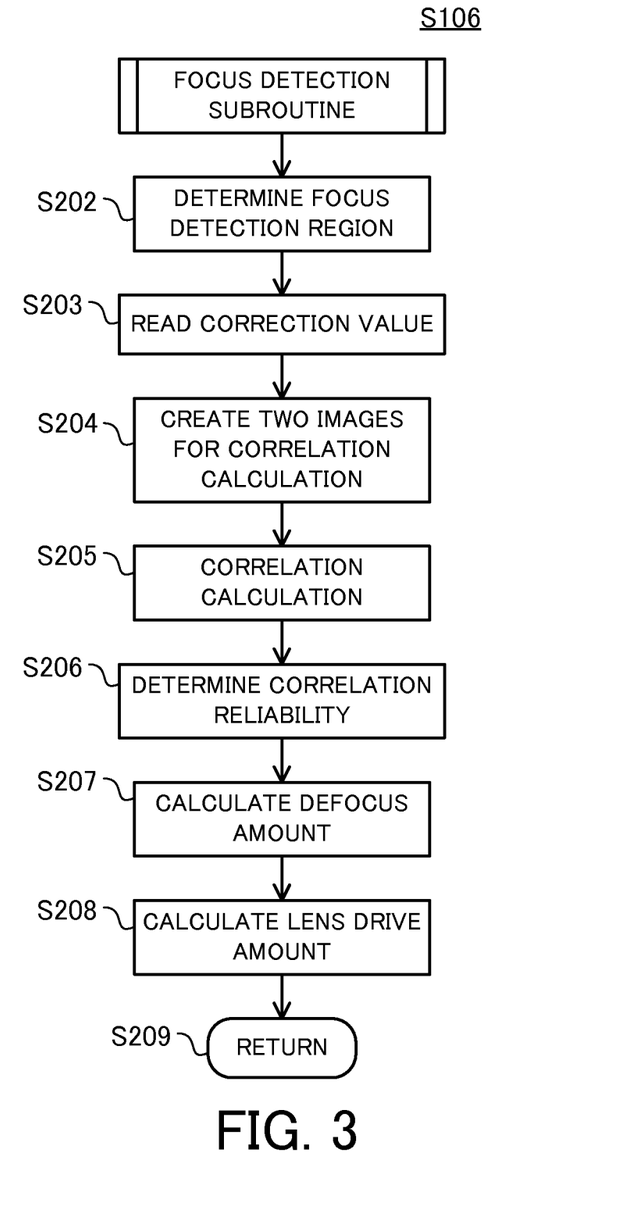
FIG. 3 is a flowchart (flow of focus detection subroutine) of the imaging operation in this embodiment.

Next, referring to FIG. 3, the focus detection (step S106 in FIG. 2) in this embodiment will be described in detail. FIG. 3 is a flowchart (focus detection subroutine) of the focus detection (step S106) of the shooting operation in this embodiment. The subroutine of FIG. 3 is called from step S106 of the main flow of FIG. 2 and is performed by the camera CPU 21.

Figure 4A:
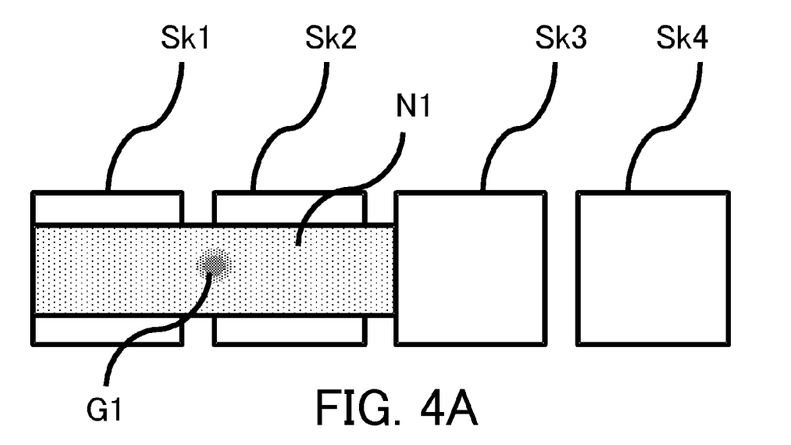
FIGS. 4A and 4B are diagrams of illustrating an AF frame and a plurality of focus detection regions in this embodiment.
Figure 4B:
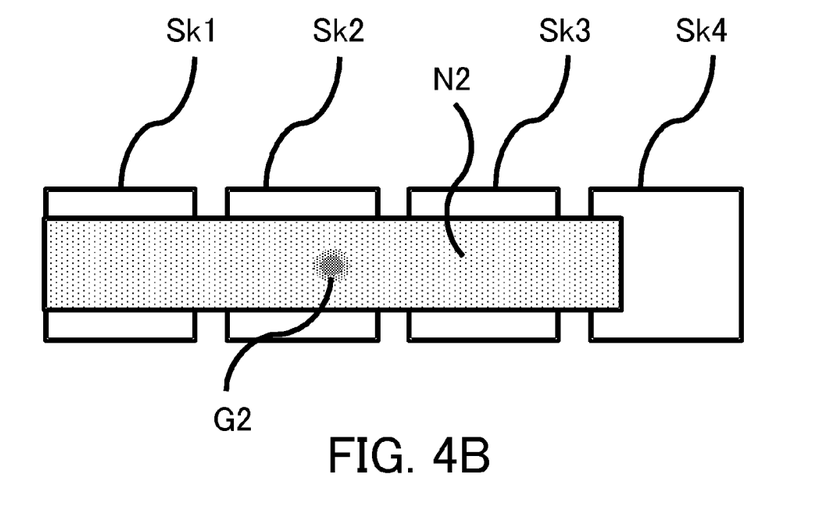

At step S202, the camera CPU 21 determines (sets) a focus detection region. Referring to FIGS. 4A and 4B, AF frames and focus detection regions will be described. FIGS. 4A and 4B are diagrams of illustrating the AF frames and the corresponding focus detection regions. In FIGS. 4A and 4B, reference symbols Sk1, Sk2, Sk3, and Sk4 denote AF frames. An AF frame to be used to perform focusing (focus control) among the AF frames Sk1, Sk2, Sk3, and Sk4 is previously set by the user for example in step S103 of FIG. 2.

Reference symbols N1 and N2 in FIGS. 4A and 4B, respectively, denote focus detection regions that correspond to the AF frame Sk1. As illustrated in FIGS. 4A and 4B, with respect to the AF frame (for example, the AF frame Sk1) set in step S103 of FIG. 2, a plurality of focus detection regions N1 and N2 that extend in the same direction and that have lengths different from each other are selectably set. Accordingly, at step S202 of FIG. 3, the camera CPU 21 selects (sets) a focus detection region from among the plurality of focus detection regions N1 and N2. Typically, a spatial frequency of an object tends to be high when a lens (interchangeable lens 300) that has a short focal length is attached to the camera body 200, and on the other hand, the spatial frequency of the object tends to be low when a lens that has a long focal length is attached. In this embodiment, for example, when the lens that has a short focal length (lens having a first focal length) is attached, the camera CPU 21 selects the focus detection region N1 (first focus detection region). On the other hand, when the lens that has a long focal length (lens having a second focal length) is attached, the camera CPU 21 selects the focus detection region N2 (second focus detection region). Thus, in this embodiment, the camera CPU 21 (selection unit) selects a focus detection region, depending on a focal length, from among a plurality of focus detection regions that correspond to the same AF frame.

As described above, at step S202, the selection unit 21a selects a focus detection region from among the plurality of focus detection regions. Preferably, the selection unit 21a selects the focus detection region in accordance with a focal length of the imaging lens 1. More preferably, the selection unit 21a selects the first focus detection region (focus detection region N1) from among the plurality of focus detection regions when the focal length is the first focal length. On the other hand, the selection unit 21a selects the second focus detection region (focus detection region N2) that is longer than the first focus detection region in a predetermined direction (for example, horizontal direction) from among the plurality of focus detection regions when the focal length is the second focal length that is longer than the first focal length.

Subsequently, at step S203, the camera CPU 21 reads a correction value (correction information) that corresponds to the focus detection region selected in step S202. The correction value is, for example, stored in the memory 22 (storage unit) of the interchangeable lens 300, and the camera CPU 21 is capable of reading the correction value that is stored in the memory 22. Alternatively, the correction value may be stored in a memory 24 (storage unit) that is provided in the camera body 200. The memory 24 provided in the camera body 200 can also be configured as an internal memory of the camera CPU 21. In this case, the camera CPU 21 reads the correction value depending on the interchangeable lens 300 from the memory 24 based on information (such as a lens ID) that is obtained via communication with the interchangeable lens 300. Alternatively, the camera CPU 21 may be configured to read the correction values from the memory 22 of the interchangeable lens 300 or the memory 24 provided in the camera body 200 for each of types of the correction values.

Figure 5:
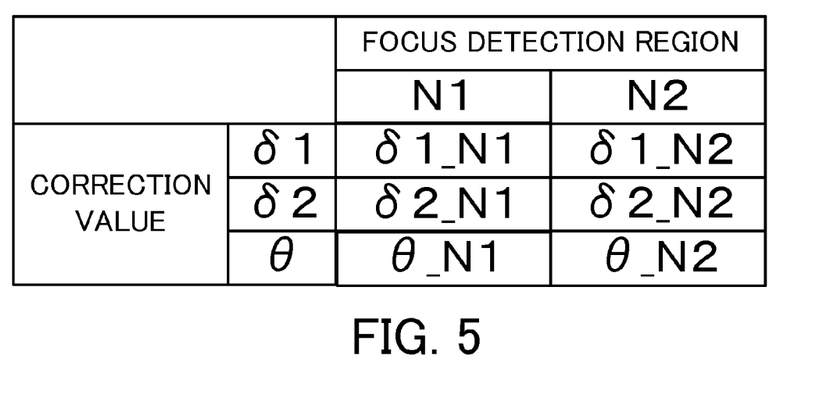
FIG. 5 is a diagram of illustrating a relation between the focus detection region and a correction value in this embodiment.

Referring to FIG. 5, the relation between the focus detection region and the correction value will be described. FIG. 5 is a diagram of illustrating the relation between the plurality of focus detection regions N1 and N2 and the corresponding correction values $\delta 1$, $\delta 2$, and $\theta$. As illustrated in FIG. 5, different correction values are set for each focus detection region.

The correction value $\delta 1$ is a value, which is determined according to a manufacturing error of the camera body 200 or the like, indicating an image shift amount in the in-focus state. The correction value $\delta 2$ is value, which is caused by an aberration of the imaging lens 1 or the like, indicating an image shift amount in the in-focus state. The correction value $\delta 2$, which is a value that is read in step S104, varies depending on the imaging lens 1 (interchangeable lens 300). The correction value $\theta$ is a value, which is determined by a base length of a pixel unit or the like, indicating the relation between the defocus amount and the image shift amount. Specifically, when the focus detection region N1 is set, the camera CPU 21 reads correction values $\delta 1\_N1$, $\delta 2\_N1$, and $\theta\_N1$. On the other hand, when the focus detection region N2 is set, the camera CPU 21 reads $\delta 1\_N2$, $\delta 2\_N2$, and $\theta\_N2$. The correction values of this embodiment are not limited to them. Correction values other than the correction values δ1, δ2, and θ can be contained, or at least one of the plurality of correction values may be used.

Subsequently, at step S204 of FIG. 3, the camera CPU 21 creates two images (pair of two images) to be used for correlation calculation, based on an output of each photoelectric conversion portion of the pixel unit corresponding to the focus detection region selected in step S202. Then, at step S205, the camera CPU 21 performs the correlation calculation in order to calculate a lateral shift amount u of the two images.

Subsequently, at step S206, the camera CPU 21 determines the reliability of a detected result of the image shift based on degree of coincidence of the two images that is calculated in the process of the correlation calculation. As a result of the reliability determination, the camera CPU 21 does not adopt a value that is determined to have low reliability. Subsequently, at step S207, the camera CPU 21 calculates the defocus amount by using the image shift amount u obtained in step S205 (image shift amount u that is determined to have high reliability) and the correction value read in step S203. In other words, the calculation unit 21b calculates the defocus amount based on the image signal from the focus detection region selected in step S202 and the correction value for the focus detection region. Then, at step S208, the camera CPU 21 calculates a drive amount of the focus lens (lens drive amount) based on the defocus amount that is calculated in step S207. Then, at step S209, the flow returns to the main routine illustrated in FIG. 2.

As illustrated in FIGS. 4A and 4B, a position of a center G1 (center of gravity) of the focus detection region N1 (first center position of the first focus detection region) is different from a position of a center G2 (center of gravity) of the focus detection region N2 (second center position of the second focus detection region). To be exact, the correction values δ1, δ2, and θ vary depending on an image height, and the defocus amount can be calculated with higher accuracy by using correction values different from each other depending on the plurality of focus detection regions as described in this embodiment.

According to this embodiment, focus detection (focus control) can be performed with higher accuracy even in using different focus detection region in accordance with a condition (shooting condition) of an imaging lens, an object, or the like with respect to the same AF frame.

Since the correction values δ1, δ2, and θ vary depending on the image height, a function (correction function) depending on the image height may be defined to store a coefficient of the function instead of storing the correction values themselves in the storage unit. In this case, at step S203 of FIG. 3, the camera CPU 21 reads the coefficient for calculating the correction value from the storage unit and calculates the correction value depending on the image height of the selected focus detection region.

In this embodiment, the focus detection region is automatically selected depending on the focal length of the imaging lens 1 at step S203. The embodiment, however, is not limited to this. For example, the focus detection region may be selected in accordance with the input of the camera operation member 50 by a user. This input is performed in accepting the setting of the shooting condition at step S103 of FIG. 2. Since the user manually sets the focus detection region by using the camera operation member 50, it is possible for the user to perform the focus detection according to the intention of the user.

In the image pickup apparatus 150 of this embodiment, the correction value varies depending on the plurality of focus detection regions. Preferably, the correction value is a correction value relating to the image shift amount. Preferably, the correction value contains a value that indicates an image shift amount in an in-focus state. Preferably, the correction value contains a value that indicates a relation between a defocus amount and the image shift amount. Preferably, the correction value varies depending on the imaging lens 1.

Preferably, the image pickup apparatus 150 includes a storage unit (for example, memories 22 and 24) that stores the correction value. In this case, the calculation unit 21b reads the correction value from the storage unit. Preferably, the image pickup apparatus 150 includes a storage unit (for example, memories 22 and 24) that stores a coefficient of a function that defines the correction value. In this case, the calculation unit 21b calculates the correction value by using the coefficient obtained from the storage unit.

Preferably, the image pickup apparatus 150 includes an input unit (camera operation member 50) that inputs a focus detection region. In this case, the selection unit 21a selects the focus detection region from among a plurality of focus detection regions in accordance with a signal from the input unit.

According to this embodiment, when the focus detection region varies (i.e. when a center position of the focus detection region is changed) depending on a condition (shooting condition) relating to the imaging lens, the object, or the like for the same AF frame, correction values different from each other are used depending on the focus detection region. Thus, according to this embodiment, an image pickup apparatus, an image pickup system, a method of controlling the image pickup apparatus, and a non-transitory computer-readable storage medium that are capable of calculating a defocus amount with high accuracy can be provided.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-016308, filed on Jan. 31, 2014, which is hereby incorporated by reference herein in its entirety.

What is claimed is:

1. An image pickup apparatus comprising:
   a light receiving element configured to photoelectrically convert an optical image to output a pair of image signals; and
   at least one processor configured to function as:
      a setting unit configured to set a focus detection region corresponding to a first AF frame, in accordance with a focal length of an imaging lens; and
      a calculation unit configured to calculate a defocus amount based on the image signals from the set focus detection region and a correction value for the set focus detection region,
   wherein the setting unit sets the focus detection region to a first state when the focal length of an imaging lens is a first length, and sets the focus detection region to a second state of which a center position is different from that of the first state when the focal length of an imaging lens is a second length which is longer than the first length,
   wherein the calculation unit uses different correction value between when the focus detection region is set to the first state and when the focus detection region is set to the second state.

2. The image pickup apparatus according to claim 1, wherein the correction value is a correction value relating to an image shift amount.

3. The image pickup apparatus according to claim 1, wherein
   a focus detection region in the second state is longer than a first focus detection region in the first state in a predetermined direction.

4. The image pickup apparatus according to claim 1, wherein the correction value contains a value that indicates an image shift amount in an in-focus state.

5. The image pickup apparatus according to claim 1, wherein the correction value contains a value that indicates a relation between the defocus amount and an image shift amount.

6. The image pickup apparatus according to claim 1, wherein the correction value varies depending on the imaging lens.

7. The image pickup apparatus according to claim 1, further comprising a memory configured to store the correction value.

8. The image pickup apparatus according to claim 1, further comprising a memory configured to store a coefficient of a function that defines the correction value,
   wherein the calculation unit is configured to calculate the correction value by using the coefficient.

9. The image pickup apparatus according to claim 1, further comprising an operation member configured to input the focus detection region,
   wherein the selection unit is configured to select the focus detection region from among the plurality of focus detection regions in accordance with a signal from the operation member.

10. The image pickup apparatus according to claim 1, wherein the plurality of focus detection regions corresponding to the AF frame include a common region.

11. An image pickup system comprising:
    an image pickup apparatus; and
    an interchangeable lens removably attachable to the image pickup apparatus,
    wherein the image pickup apparatus includes:
       a light receiving element configured to photoelectrically convert an optical image to output a pair of image signals; and
       at least one processor configured to function as:
          a setting unit configured to set a focus detection region corresponding to a first AF frame, in accordance with a focal length of an imaging lens; and
          a calculation unit configured to calculate a defocus amount based on the image signals from the set focus detection region and a correction value for the set focus detection region,
       wherein the setting unit sets the focus detection region to a first state when the focal length of an imaging length is a first length, and sets the focus detection region to a second state of which a center position is different from that of the first state when the focal length of an imaging lens is a second length which is longer than the first length,
       wherein the calculation unit uses different correction value between when the focus detection region is set to the first state and when the focus detection region is set to the second state.

12. A method of controlling an image pickup apparatus, the method comprising the steps of:
    converting photoelectrically an optical image to output a pair of image signals;
    setting a focus detection region corresponding to a first AF frame, in accordance with a focal length of an imaging lens; and
    calculating a defocus amount based on the image signals from the set focus detection region and a correction value for the set focus detection region,
    wherein the setting step sets the focus detection region to a first state when the focal length of an imaging lens is a first length, and sets the focus detection region to a second state of which a center position is different from that of the first state when the focal length of an imaging lens is a second length which is longer than the first length,
    wherein the correction value differs between when the focus detection region is set to the first state and when the focus detection region is set to the second state.

13. A non-transitory computer-readable storage medium storing a program to cause a computer to execute a process comprising the steps of:
    setting a focus detection region corresponding to a first AF frame, in accordance with a focal length of an imaging lens; and
    calculating a defocus amount based on the image signals from the set focus detection region and a correction value for the set focus detection region,
    wherein the setting step sets the focus detection region to a first state when the focal length of an imaging lens is a first length, and sets the focus detection region to a second state of which a center position is different from that of the first state when the focal length of an imaging lens is a second length which is longer than the first length, wherein the correction value differs between when the focus detection region is set to the first state and when the focus detection region is set to the second state.

\* \* \* \* \*